United States Patent
Dobbins et al.

(10) Patent No.: US 7,340,144 B2
(45) Date of Patent: Mar. 4, 2008

(54) OPTICAL FIBER SPLICE ENCLOSURE

(75) Inventors: Patrick E. Dobbins, Greer, SC (US); Anthony L. Nieves, Fountain Inn, SC (US); Firoz Narsidani, Greenville, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 0 days.

(21) Appl. No.: 11/478,769

(22) Filed: Jul. 3, 2006

(65) Prior Publication Data

US 2007/0086721 A1    Apr. 19, 2007

Related U.S. Application Data

(60) Provisional application No. 60/698,986, filed on Jul. 14, 2005.

(51) Int. Cl.
*G02B 6/00* (2006.01)

(52) U.S. Cl. ........................... 385/135; 385/134

(58) Field of Classification Search .............. 385/53, 385/99, 134, 135, 136, 137, 138, 95, 96, 385/139

See application file for complete search history.

(56) References Cited

U.S. PATENT DOCUMENTS

| 5,717,811 | A | * | 2/1998 | Macken ...................... 385/135 |
| 5,787,219 | A | * | 7/1998 | Mueller et al. ............. 385/134 |
| 6,226,434 | B1 | * | 5/2001 | Koshiyama et al. ........ 385/134 |
| 2007/0086721 | A1 | * | 4/2007 | Dobbins et al. ............ 385/135 |

* cited by examiner

*Primary Examiner*—Brian M. Healy
(74) *Attorney, Agent, or Firm*—Sughrue Mion, PLLC

(57) ABSTRACT

A fiber optic housing including a base and a cover pivotally to the base. A first guide is provided through which a fiber optic cable enters the housing, along with a second guide through which the fiber optic cable exits the housing. The cover is moveable between an open and closed position, such that the cover forms a horizontally extending tray when in the open position. A splice tray mounting portion is provided within the housing with at least one splice tray. The closure is configured such that a loop of slack buffer tubes is wound around an inner circumferential area of the housing.

31 Claims, 8 Drawing Sheets

OPTICAL FIBER SPLICE ENCLOSURE

CROSS REFERENCE TO RELATED APPLICATION

This application claims the benefit of provisional patent application Ser. No. 60/698,986 filed Jul. 14, 2005, entitled "Optical Fiber Splice Enclosure."

BACKGROUND OF INVENTION

1. Field of Invention

The present invention relates generally to the field of fiber optics and, more particularly, to an optical fiber splice enclosure used in the 2. Background of the Invention Optical fiber systems are becoming widely used to transmit large volumes of data through fiber optic cables over relatively long distances. Fiber optic cables are often suspended between poles, towers, or other above-ground structures. Some fiber optic cables do not have sufficient strength to support their own weight between the poles. In this case, a support strand may be suspended between the poles and along the cable. Alternatively, some fiber optic cables enclose a cable wire messenger wire in an outer sheath of the cable to provide support and increased tensile strength.

Closures are used to protect connections between spliced optical fibers. A splice is generally required for connecting ends of cable segments. For example, a splice may be needed if a distance between connection points is greater than the length of a roll of fiber optic cable. A splice may also be needed to form a branch or drop line that extends from a main service cable.

Aerial closures are generally employed to enclose suspended cables and to provide drop lines from the main service to individual subscribers and businesses. Closures have also been provided with splice trays to facilitate the splicing between optical fibers. Once the required splices are made, the outer housing of the closure is secured around the splice trays to protect the splices from contamination, water and other environmental factors.

In aerial fiber optic cable systems, that utilize Loose Tube fiber optic cable, All-Dielectric Self-Supporting (ADSS) fiber optic cable or Integrated Messenger (IM) fiber optic cable, there is not an effective way to provide a distributive customer access without having extensive fiber splicing cost. In traditional fiber optic cable systems, the wire cable messenger provides a support mechanism to hang and support the traditional fiber optic splice closure. In ADSS an IM type cables, however, there is no external supporting messenger, and in various networks, there is a need to quickly access the fibers without having to remove cable from storage devices to create enough slack to splice the optical fibers. A closure is needed that optimizes "slack loop" access to Loose tube fiber, ADSS and IM cables, for example, without having to relocate cable and which has special provisions for cable routing, buffer unit routing and fiber organization.

SUMMARY OF INVENTION

Illustrative, non-limiting embodiments of the present invention overcome the disadvantages described above and other disadvantages. Also, the present invention is not required to overcome the disadvantages described above and the other disadvantages, and an illustrative, non-limiting embodiment of the present invention may not overcome any of the disadvantages.

An exemplary embodiment of the present invention includes a fiber optic closure comprising a base and a cover pivotally mounted to the base to provide a housing. A first guide is provided through which a fiber optic cable enters the housing, along with a second guide through which the fiber optic cable exits the housing. The first and second guides are disposed to extend in different directions. The cover is moveable between an open and closed position, such that the cover forms a horizontally extending tray when in the open position.

Further included is a splice tray mounting portion within the housing and at least one splice tray attached to the splice tray mounting portion. The splice tray has a splice holder which secures at least one fiber optic splice. The closure is configured such that a loop of slack buffer tubes, of the fiber optic cable, is wound around an inner circumferential area of the housing. A portion of the loop may be tucked under the splice tray mounting portion.

In further accordance with an exemplary embodiment, the fiber optic closure comprises at least one reel which protrudes from the splice tray, such that at least one buffer tube, including an optical fiber of the fiber optic cable, is retained by the splice tray mounting portion. An end portion of the buffer tube extends past the splice tray mounting portion and is retained by the splice tray, such that the optical fiber extends from the buffer tube and is wrapped around the reel.

The fiber optic closure, according to an exemplary embodiment also includes a second reel that protrudes from the splice tray. A second buffer tube, having an optical fiber of a second fiber optic cable, is retained by the splice tray mounting portion, such that an end portion of the second buffer tube extends past the splice tray mounting portion and is retained by the splice tray. The optical fiber of the second buffer tube extends from the second buffer tube and is wrapped around the second reel, such that the optical fibers are spliced together and held by the splice holder. A transition tube is provided around an end portion of the buffer tube and is held between the splice tray mounting portion and the splice tray.

The fiber optic closure may comprise a plurality of splice trays that are provided in a stacked arrangement along the splice tray mounting portion, wherein the plurality of splice trays are independently pivotable. The plurality of splice trays may each include splice holders which retain spliced optical fiber portions. Further, grommets may be respectively provided in the first and second guides and may include through holes for the passage of the fiber optic cable.

In a further exemplary embodiment, a fiber optic housing is provided that comprises a first segment and a second segment. A hinge is attached to the first and second segments such that the second segment is movable between an open and closed position. The hinge is disposed at a bottom of the housing and may comprise an extension of the first segment and an extension of the second segment. A first channel is provided through which a fiber optic cable enters the housing, along with a second channel through which the fiber optic cable exits the housing. The first and second channels extend from the first segment at a top portion of the housing.

The top portion of the housing may comprise sloped end portions that intersect with corners of the housing. In an exemplary embodiment, an area between the corners forms a top side of the housing and a length of the top side is greater than a length of any other side of the housing.

Further, the second segment may have a planar bottom that faces a ground area when in the open position.

In an even further exemplary embodiment of the invention, a fiber optic housing is provided that comprises a first segment and a second segment. A hinge is attached to the first and second segments so that the second segment is movable between an open and closed position. A first channel is provided through which a fiber optic cable enters the housing, along with a second channel through which the fiber optic cable exits the housing. A splice tray mounting board is disposed within the housing and at least one splice tray is attached thereto. The splice tray has a splice holder that secures at least one fiber optic splice. Further, included is at least one reel that protrudes from the splice tray, wherein at least one buffer tube, including an optical fiber of the fiber optic cable, is retained by the splice tray mounting board, such that an end portion of the buffer tube extends past the splice tray mounting board and is retained by the splice tray. The optical fiber extends from the buffer tube and is wrapped around the reel. A transition tube is also provided around an end portion of the buffer tube and is held between the splice tray mounting board and the splice tray.

It is also contemplated that a second reel is provided which protrudes from the splice tray, and a second buffer tube, including an optical fiber of a second fiber optic cable, is retained by the splice tray mounting board, such that an end portion of the second buffer tube extends past the splice tray mounting board and is retained by the splice tray. The optical fiber of the second buffer tube extends from the second buffer tube and is wrapped around the second reel, such that the optical fibers are spliced together and held by the splice holder. A second transition tube is provided around an end portion of the second buffer tube and is held between the splice tray mounting board and the splice tray.

Features of the invention include lowering the cost of fiber cable access due to utilizing less cable, not splicing un-needed fibers at a given access point and improving the speed of a network deployment by not requiring relocation of extra cable to provide fiber to an access node. This results in a cost effective solution that saves both time and money.

BRIEF DESCRIPTION OF THE DRAWINGS

The above aspects and features of the present invention will become more apparent by describing exemplary embodiments thereof with reference to the attached drawings, in which.

DETAILED DESCRIPTION OF ILLUSTRATIVE, NON-LIMITING EMBODIMENTS

The following description of illustrative, non-limiting embodiments of the apparatus discloses specific configurations and components. However, the embodiments are merely examples of the present invention and, thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, components, processes and operations of the embodiments that are known to one skilled in the art are omitted for the sake of clarity and brevity.

Figure 1:
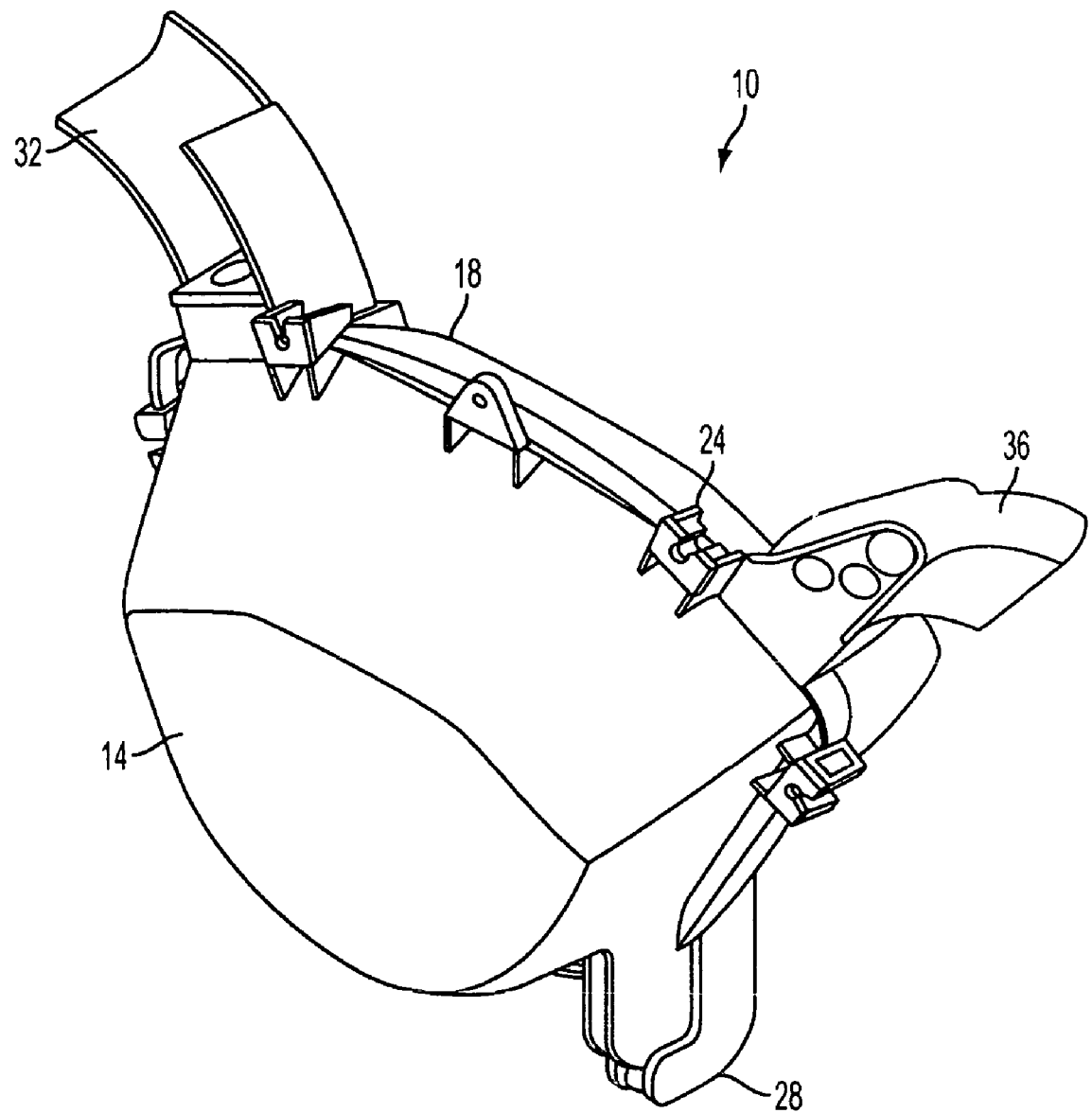
FIG. 1 is a front view of an exemplary fiber optic closure that is closed.
Figure 2:
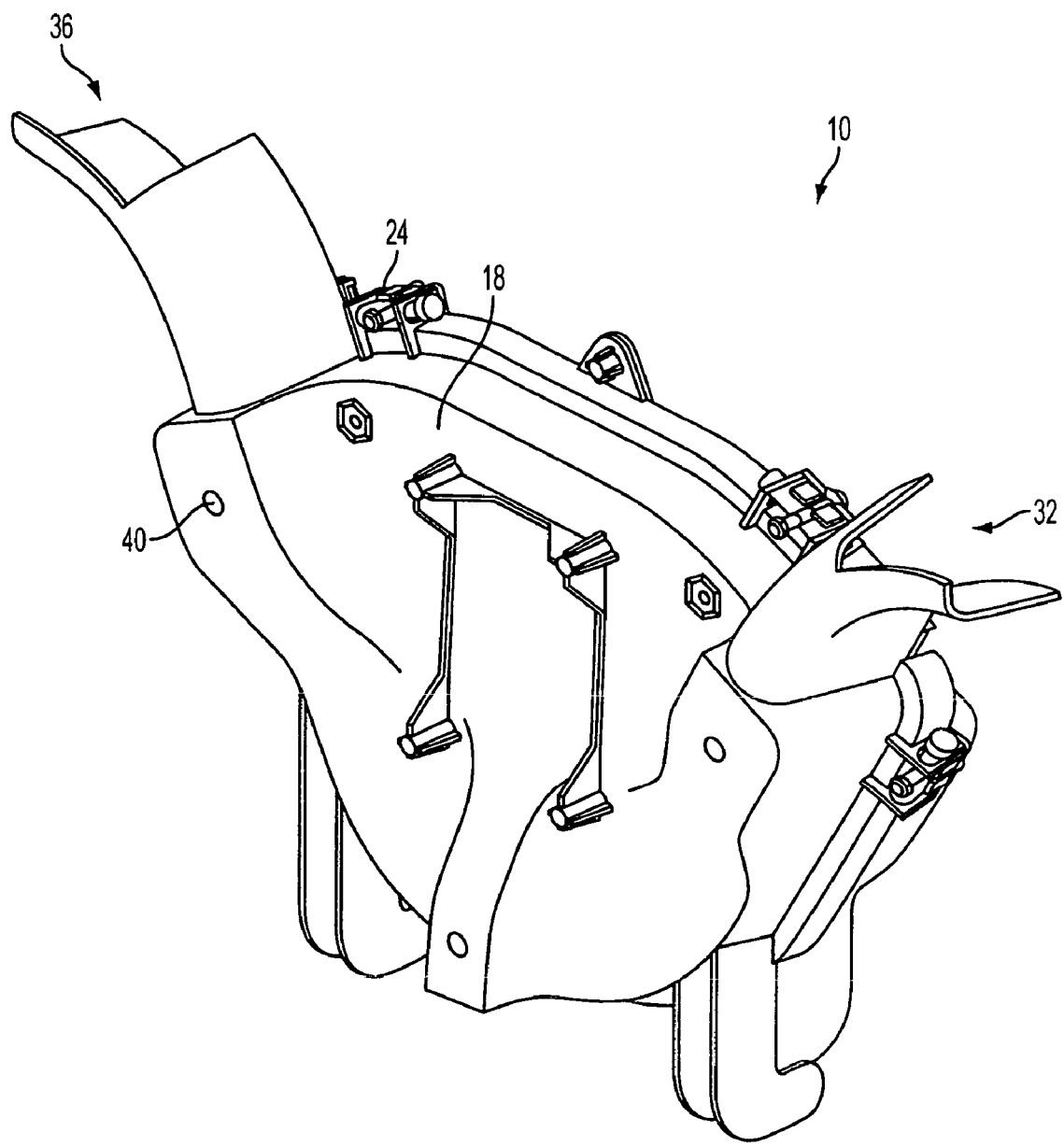
FIG. 2 is a rear perspective view of the fiber optic closure shown in FIG. 1.

FIGS. 1 and 2 depict an exemplary fiber optic closure 10 used for splicing together a plurality of optical fibers and/or fiber optic cables. The optical fiber closure comprises a housing cover 14 and housing base 18 which are mated such that the closure 10 may be opened and closed to form a seal that restricts entry of contaminants, such as dirt, water and the like. Generally, the housing cover 14 and housing base 18 are fastened together by latches 24 and a hinge 28. The hinge 28 forms a pivot point such that the housing cover 14 may be rotatably separated from the housing base 18. In an exemplary embodiment, the fiber optic closure 10 is molded from a suitable polymer, such as polyethylene or the like. The fiber optic closure may also be made of metals, such as aluminum or steel. The hinge components may be integrally formed with the cover 14 and base 18. Also, as will be appreciated by one skilled in the art, the fiber optic closure 10 may be made by any conventional molding technique, such as blow molding, injection molding and the like.

The fiber optic closure 10 is designed to house fiber optic cables, including bundles of individual buffer tubes that are encased within an outer protective sheath, as discussed further below. The buffer tubes respectively include a plurality of optical fibers that are stranded together. In an exemplary embodiment, there are twelve optical fibers contained within each buffer tube, and there may be, for example, twelve buffer tubes in each optical fiber cable. However, it will be appreciated that the number of optical fibers and buffer tubes may vary depending on the particular application. Also, while exemplary embodiments of the invention are described with reference to optical fibers in optical fiber cables, it will be appreciated by those skilled in the art, that the invention is not limited in this regard and is applicable as well to, for example, fiber optic ribbon.

The fiber optic closure 10 further includes a right guide channel 32 and a left guide channel 36 respectively disposed adjacent to right and left corners 37 and 38 of the closure 10. The right and left guide channels 32 and 36 are angled to provide a smooth entry of the cables into the closure 10.

Figure 3:
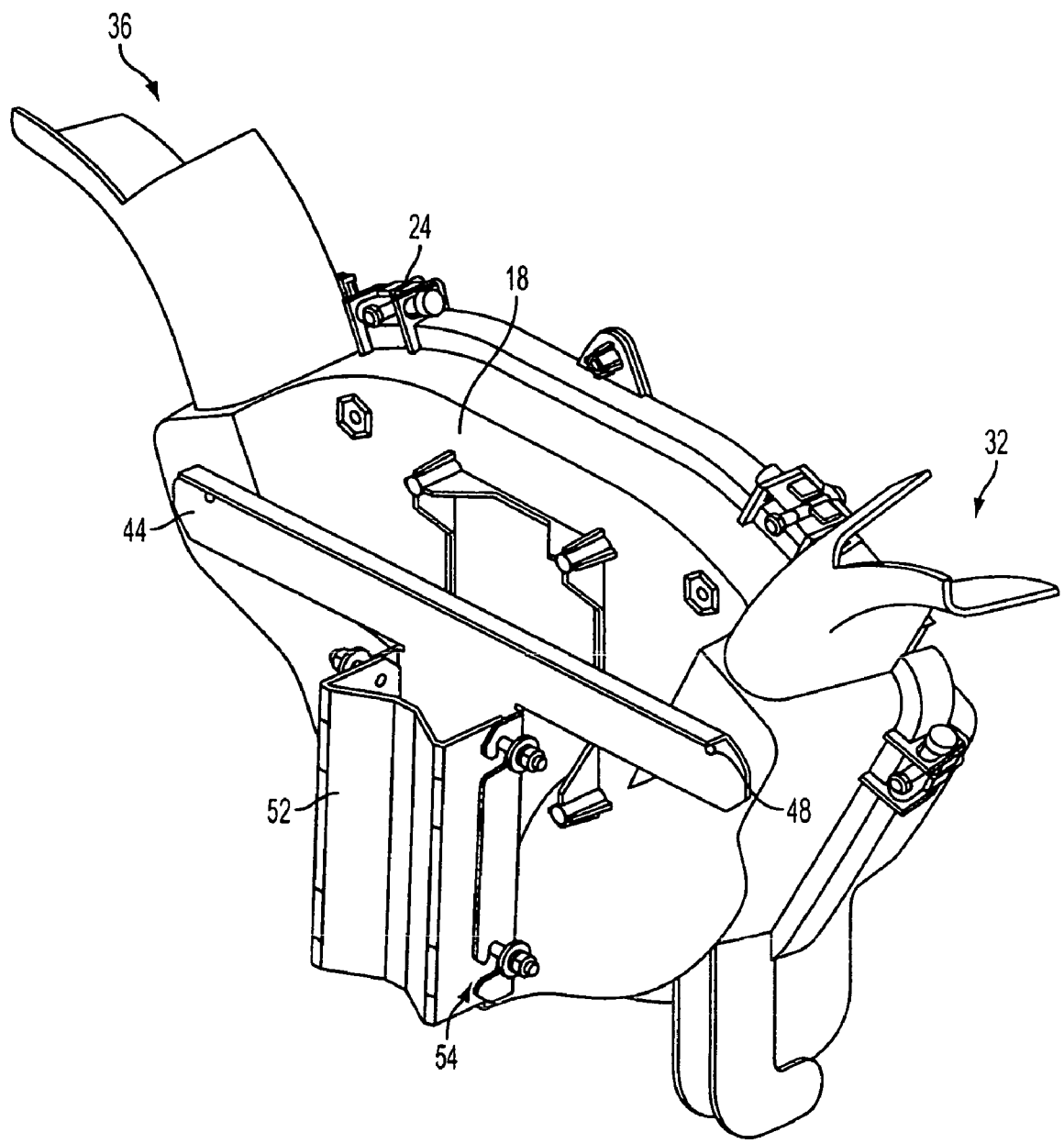
FIG. 3 is a rear perspective view of an exemplary embodiment of the fiber optic closure.

As shown in FIG. 2, the housing base 18 includes a plurality of mounting holes 40 for attaching the closure 10 to a fixture, such as a pole or wall. With additional reference to FIG. 3, an exemplary housing mount 44 is fastened to the housing base 18 via fasteners 48. As will be appreciated, standard fasteners, such as screws and the like, may be used to attach the housing mount 44 to the housing base 18. The housing mount 48 is in turn fastened to a mount bracket 52 positioned on the pole or wall. The housing mount 48 may include slotted portions 54 that retain the housing mount 44 to the mount bracket 52. Additional mounting brackets may be used for mounting to the messenger of a messenger supported cable system or directly to an ADSS cable or an ADSS cable tension dead-end.

Figure 4:
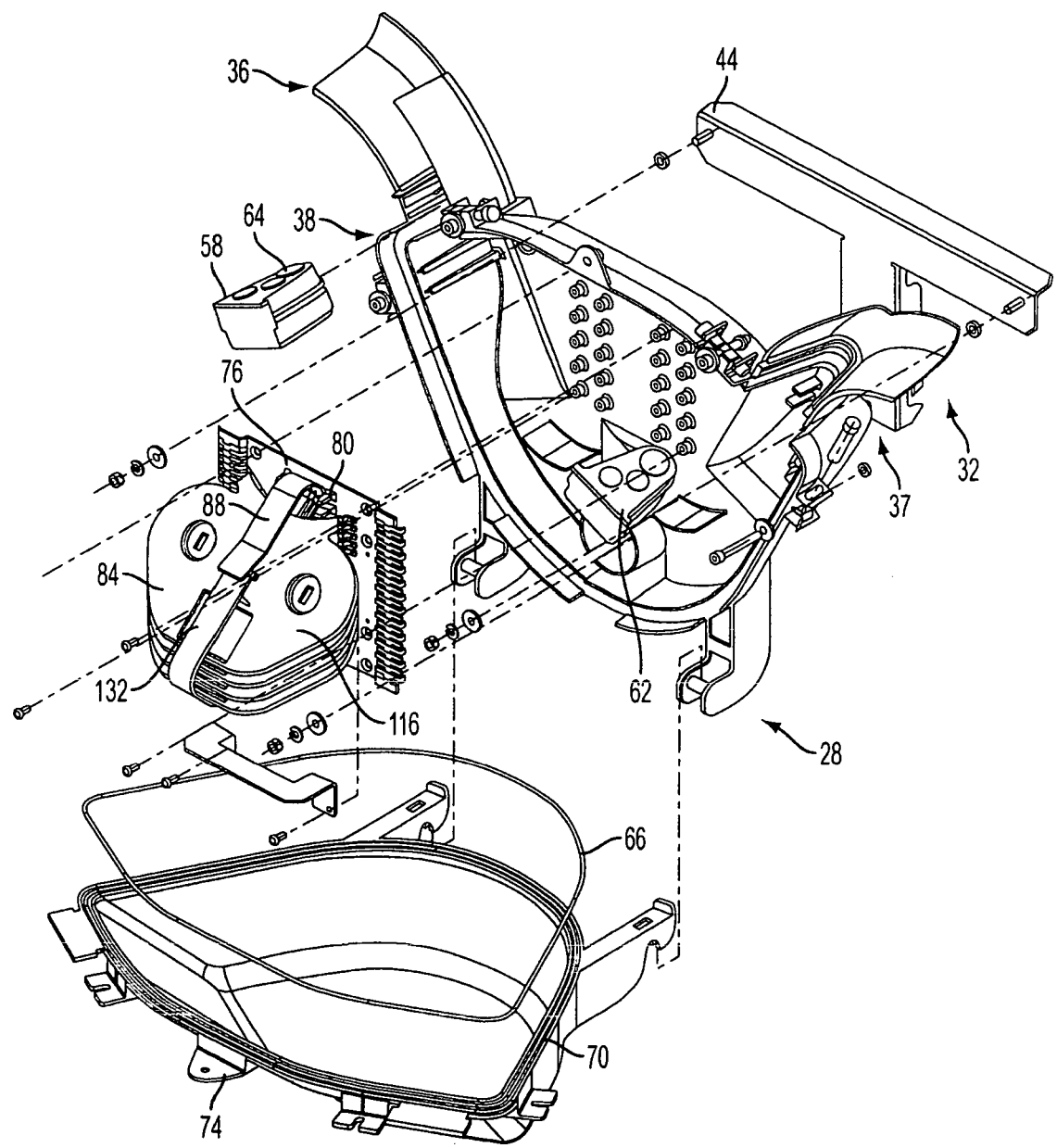
FIG. 4 is an exploded perspective view of an exemplary embodiment of the fiber optic closure.

As shown in FIG. 4, the fiber optic closure 10 includes a left side cable entry grommet 58 positioned approximate an opening of the left guide channel 36. A right side cable entry grommet 62 is similarly disposed near an opening of the right guide channel 32.

The cable entry grommets 58 and 62 provide a seal to prohibit entry of contaminants into the fiber optic closure. In an exemplary embodiment, the grommets each include three cable entry ports 64, where two of the ports are used as express ports for cable diameters, e.g., up to 17 mm and the other four ports may be used for drop or branch line cables with diameters, e.g., up to 15 mm. It will be appreciated that grommets can be provided with varying sized ports to address different cable diameters. The grommets may be designed to incorporate more or less ports, with varying dimensions, depending on the particular design requirements and application of the fiber optic closure 10. The grommets 58 and 62 ensure a water-tight seal with the fiber optic cables. A gasket 66 is provided between the housing cover 14 and housing base 18 to further restrict entry of contaminants into the closure 10. The gasket 66 is positioned in a channel 70 of the housing cover 14 surrounding an inner opening of the lock cover 14.

A securing hole 74 is provided on the housing cover 14 and housing base 18, respectively, to provide an attachment point for a lock. When the fiber optic closure 10 is in an unlocked state, the housing cover 14 may be rotated in an outward direction via the hinge 28 to permit access inside the closure 10

The closure 10 is provided with a splice tray mounting board 76 that is fastened to an inner surface of the housing base 18. As discussed in more detail below, the mounting board 76 includes a plurality of splice tray mounts 80 to which individual splice trays 84 are pivotally attached. In an exemplary embodiment, twelve splice tray mounts 80 are provided to enable an equal number of splice trays 84 to be fastened to the splice tray mounting board 76. The splice tray mounting board 76 may be fastened to the housing base 18 using standard fasteners, such as screws or bolts. The splice trays 84 are provided in a stacked arrangement so that they can be pivotally connected to the splice tray mounts 80. The individual splice trays 84 are movable between a stacked position and a raised position to facilitate access to an underlying spice tray. A fastening latch 88 may be provided to secure the plurality of splice trays in place.

Figure 5:
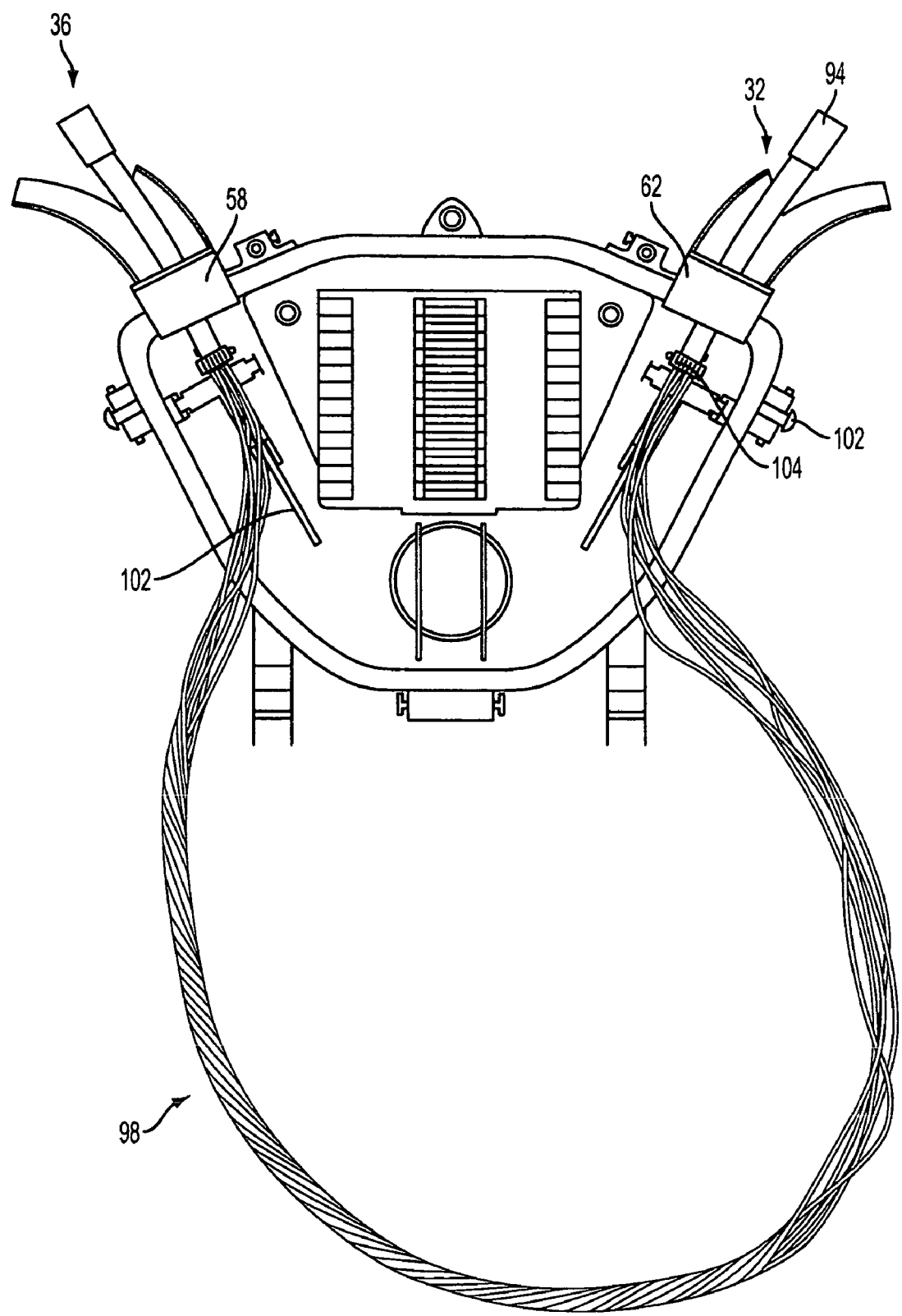
FIG. 5 is a front perspective view of an exemplary embodiment of the fiber optic closure showing a housing base.

In operation, as shown in FIG. 5, an express fiber optic cable 94, having an outer sheath, is inserted through one of the guide channels 32 and 36 and exited through the other of the guide channels 32 and 36 to provide an amount of slack between the guide channels 32 and 36. In an exemplary embodiment, 1.5 meters of slack is provided between the guide channels 32 and 36 to ensure a sufficient length for carrying out the splicing procedure. During installation, the cable 94 is cut to remove the outer sheath, binders and any mylar wrappers, such that individual buffer tubes 98 can be separated from a central strength member (CSM) 102 and the CSM is cut to a length, for example, 45 mm, on each side of the outer sheath of the fiber optic cable 94. The CSM is then removed and the buffers tubes 98 are unbundled.

The closure 10 utilizes the natural cable slack between the two dead-ends of the cable. This allows a technique called "slack loop" access to be facilitated. Slack loop access provides access to the fibers of a specific buffer tube without having to cut adjacent buffer tubes of the same cable. At locations where all the fibers in a cable need to be spliced, a minimal amount of spare cable is required, thus, lowering costs by reducing the need for excessive cable, additional cable relocation, or excessive time in cable preparation.

As one skilled in the art will appreciate, the fiber optic cable 94 that enters the grommets 58 and 62, as well as the individual buffer tubes 98, should be cleaned to ensure that no dirt, grease or other contaminants are present. Further, the fiber optic cable 94 should be smooth and not damaged so as to provide a proper seal between the fiber optic cable 94 and the grommets 58 and 62.

The closure 10 uses the guide channels 32 and 36 to guide the cable into the closure 10. The grommets 58 and 62 provide for a range of cable diameters and create an effective seal against water intrusion into the splice closure. The angled guide channels 32 and 36 provide a bend radius to assure that the cable is not kinked or bent to less than an allowable bend radius. The housing cover 14 is hinged to become a work surface for the splicing operation, and may use a lanyard. Interior cable guides and buffer guides may be used to provide easy access to the desired fiber with minimum cable slack. The closure 10 is also breathable, while providing a unique door seam that prevents moisture egress and allows for ease of entry. In an exemplary embodiment the door seam has a grooved lip that permits the use of an o-ring seal and also may have a vent option at the bottom to allow condensation to exit the closure 10.

If necessary, the grommets 58 and 62 may be modified to properly enclose the optical fiber cable 94 and ensure a proper cable fit. If a gap remains around the optical fiber cable 94 and the grommets 58 and 62, sealing tape may be provided to seal the area and ensure that no leaks will occur.

The tips of the CSM 102 are placed into strain relief brackets 102 to securely retain the CSM 102. A cable retention hose clamp 104 is then placed around the cable 94. As will be appreciated, the cable retention hose clamp 104 will prevent damage to the optical fibers due to tensile forces applied to the cable 94. After both the left and right grommets 58 and 62 are properly sized to fit the fiber optic cable, entry of the express fiber optic cable 94 is complete and the grommets 58 and 62 can be slid into the housing base 18 and secured in place. The strain relief brackets 102 and hose clamp 104 are also slid in place along with the grommet.

Figure 6:
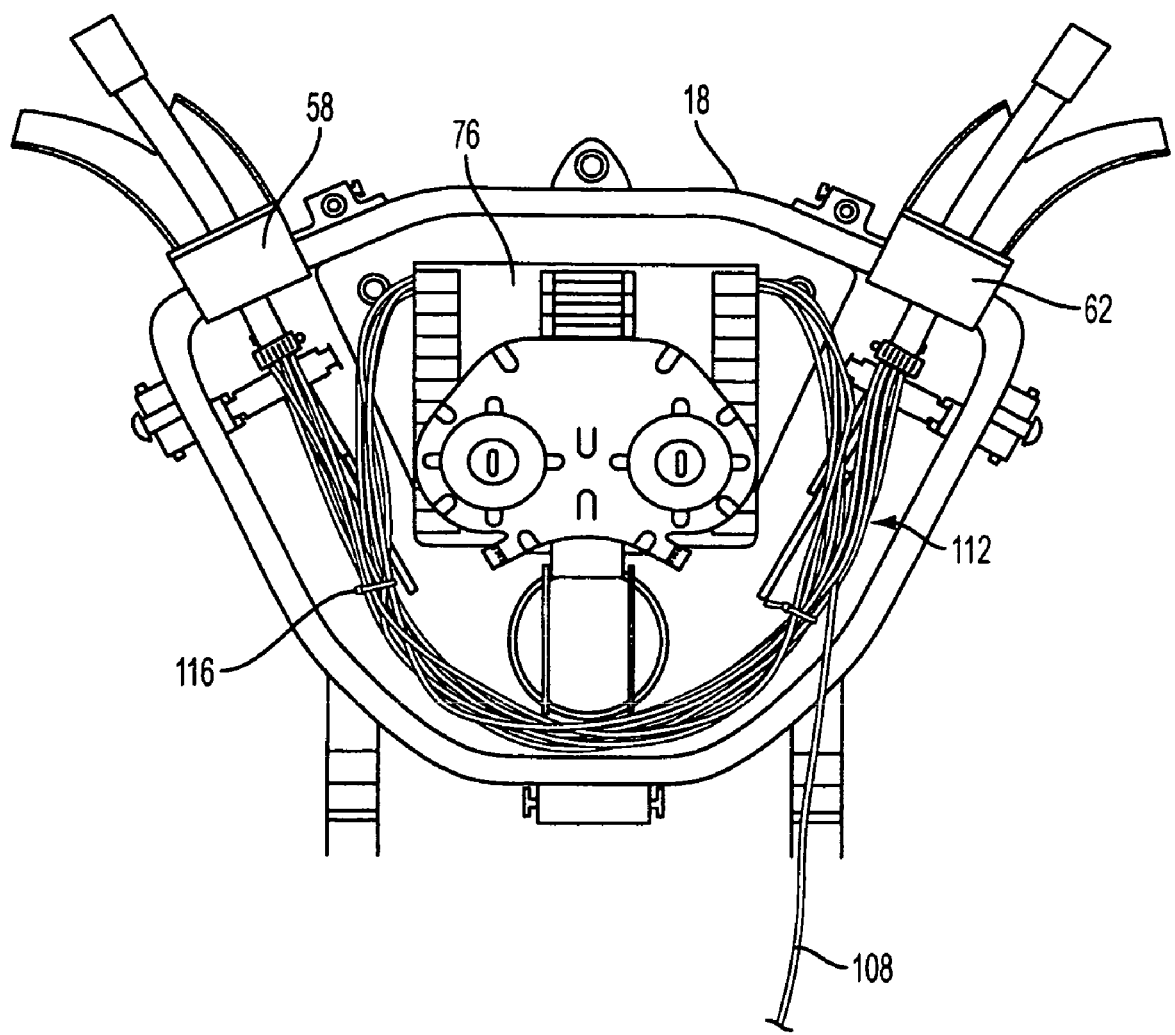
FIG. 6 is a perspective front view shown an exemplary aspect of the fiber optic closure.

As shown in FIG. 6, the remaining buffer tubes 98 are looped and stored in a buffer tube storage area 112 and follow along an inner circumferential area of the housing base 18. The stored buffer tubes 98 may then be secured with tie wraps 116 while assuring that no kinks are present, as well as assuring that there is no potential for kinking to occur when the housing cover 18 is closed. An upper part of the wound buffer tubes 98 may be placed behind the splice tray mounting board 76.

An individual buffer tube 108 having optical fibers, which need to be spliced, are separated from the other buffer tubes 98. Depending on the access requirements, the separated buffer tube 108 may be cut either in the center of the slack loop or to one side.

As those skilled in the art will readily appreciate, it is important that the storage area 112 provides an adequate width and length to allow the wound buffer tubes 98 to be coiled without exceeding a predetermined bend radius, which could potentially damage the bluffer tubes 98 or enclosed optical fibers.

Depending on the optical fiber configuration and splicing network options, the buffer tube 108 to be spliced is stripped back to expose the individual optical fibers inside. The optical fibers should be carefully cleaned to ensure that no contaminants are present and that fiber gel is removed.

Figure 7:
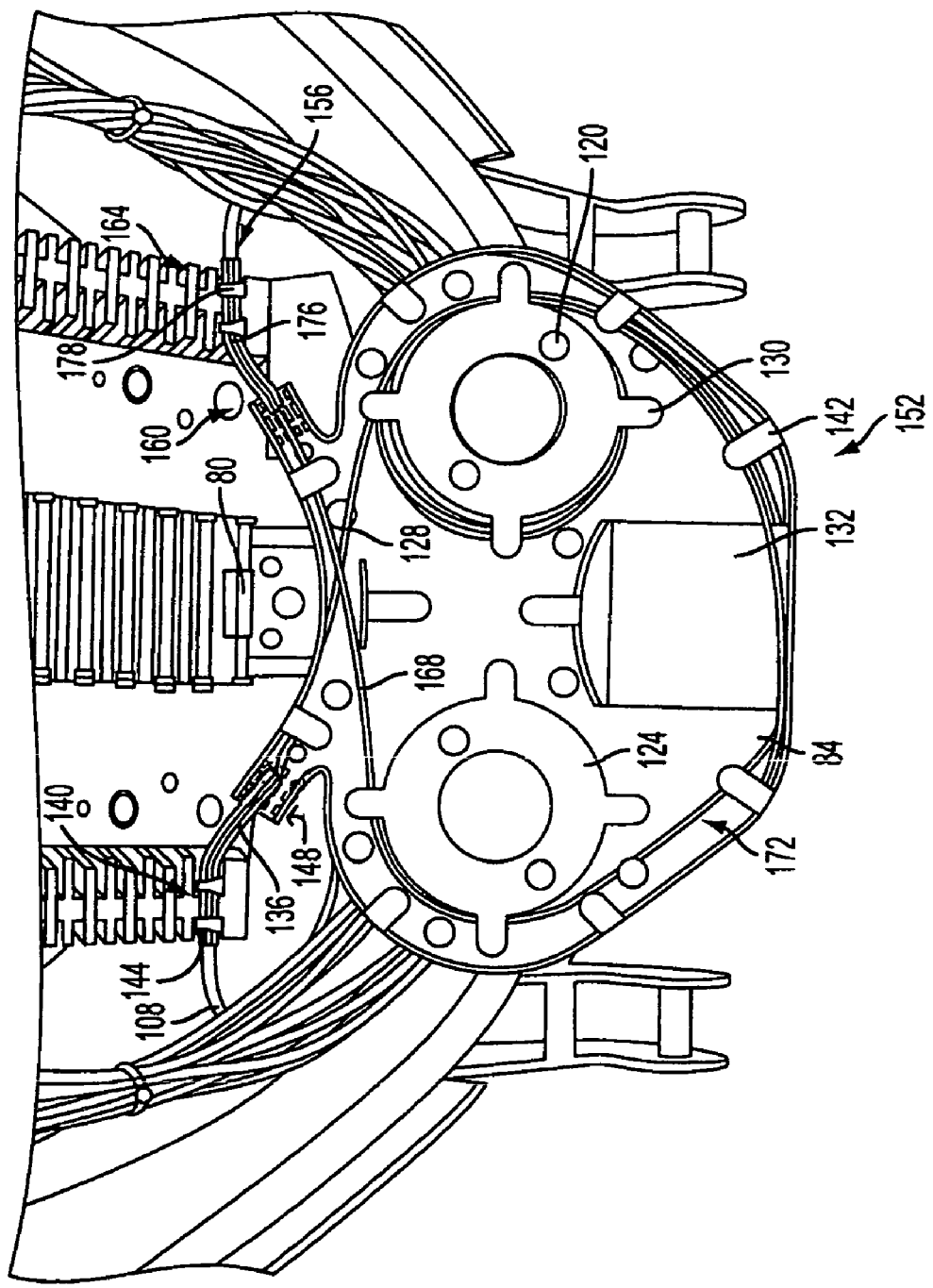
FIG. 7 is a front view showing another exemplary aspect of the fiber optic closure.

As shown in FIG. 7, a first splice tray 84 is mounted at a bottom splice tray mount 80 and snapped in place. The splice tray 84 may include the outer cover 116 shown in FIG. 4. The splice tray 84 further includes a right optical fiber reel 120 and a left optical fiber reel 124. Optical fibers 128, which are removed from the buffer tube 108, are then wrapped around one of the reels 120 and 124. Securing tabs 130 are provided around a circumference of the respective reels 120 and 124 to hold the optical fiber 128 in place. A splice holder 132 is disposed on the splice tray 84 to provide an area for securing the optical fibers 128 after they are sliced.

A transition tube 136 is placed around an end portion of the buffer tube 108 and extends past an end of the buffer tube 108 to surround a portion of the exposed optical fibers 128. The transition tube 136 is then depressed into a strain relief block 140 and is held in place with tie-wraps 144. The other end of the transition tube 136 is attached to the splice tray 84 at a retention point 148 and crimped or otherwise fastened in place. Therefore, the buffer tube 108 and exposed optical fibers 128 are connected in such a manner that tensile stress applied during the course of ordinary use will not damage the optical fibers 128. The optical fibers 128 are then wound around the right reel 120 and their free ends 152 are held in tabs 142. An additional strain relief block 156 is provided to the right of the tray mounting board 76 so that the buffer tube 164 may be held in place similar to the buffer tube 108. Also, the splice tray 84 includes a second entry retention point 160 opposite the first retention point 148.

Figure 8:
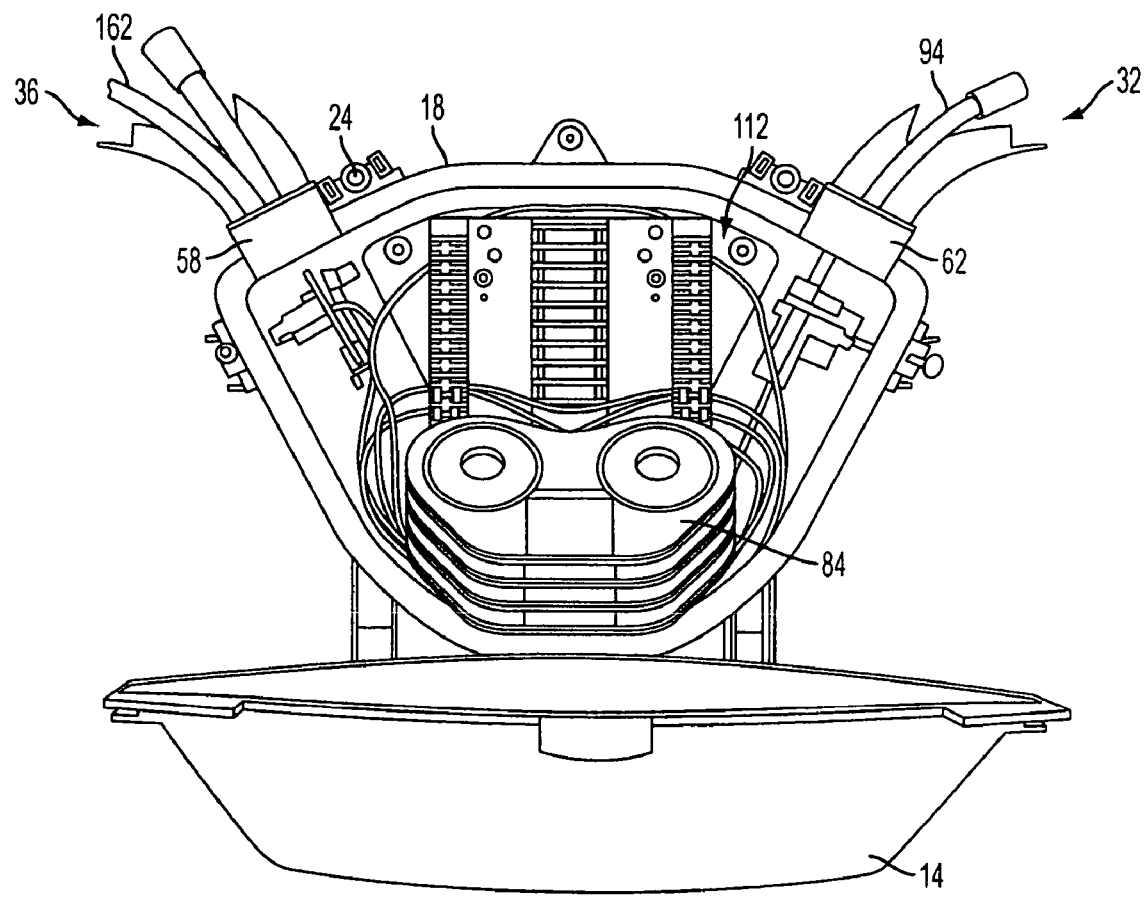
FIG. 8 is a front view of an opened fiber optic closure in accordance with an exemplary embodiment of the present invention.

With additional reference to FIG. 8, a branch cable and/or drop line 162 is then placed within the appropriate holes of either grommet 52 and 62. A proper fit should be assured between the drop/branch line 162 and the grommets 58 and 62. In the same manner described above, a buffer tube 164 from the drop or branch line 162 is stripped and fastened to the strain relief block 156 and retention point 160. Optical fibers 168 from the buffer tube 164 are then wound around the left reel 124 such that their free ends 172 are available and ready to be spliced with the free ends 152 of the optical fibers 128.

The above noted procedure is repeated for all of the buffer tubes to be spliced from the main cable 94 to the drop/branch line 162. Buffer tubes from each of the main cable 94 and the drop/branch line will be mated in respective splice trays 84. In particular, the first drop/branch cable buffer tube 164 to be spliced, is stripped back to expose the individual optical fibers 168 inside. The optical fibers 168 are then cleaned to remove any contaminants and fiber gel. In a manner similar to that described above, the buffer tube 168 is then transitioned into a soft support transition tubing 176. Each buffer tube is then strain relieved onto the strain relief block 156 utilizing tie-wraps 178. The procedure is then repeated until each buffer tube of the drop/branch lines is assigned to a respective splice tray 84.

The previous description of the exemplary embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein, but is to be accorded the widest scope as defined by the limitations of the claims and equivalents thereof.

What is claimed is:

1. A fiber optic closure comprising:
   a base;
   a cover pivotally mounted to the base to provide a housing;
   a first guide through which a fiber optic cable enters the housing;
   a second guide through which the fiber optic cable exits the housing, the first and second guides being disposed to extend in different directions;
   a splice tray mounting portion within the housing; and
   at least one splice tray attached to the splice tray mounting portion, the splice tray having a splice holder which secures at least one fiber optic splice,
   wherein a loop of slack buffer tubes of the fiber optic cable is wound around an inner circumferential area of the housing.

2. The fiber optic closure of claim 1, wherein the cover is moveable between an open and closed position, such that the cover forms a horizontally extending tray when in the open position.

3. The fiber optic closure of claim 1, wherein a portion of the loop is tucked under the splice tray mounting portion.

4. The fiber optic closure of claim 1, further comprising at least one reel which protrudes from the splice tray,
   wherein at least one buffer tube including an optical fiber of the fiber optic cable is retained by the splice tray mounting portion, such that an end portion of the buffer tube extends past the splice tray mounting portion and is retained by the splice tray, and the optical fiber extends from the buffer tube and is wrapped around the reel.

5. The fiber optic closure of claim 4, wherein a second reel is provided which protrudes from the splice tray, and a second buffer tube including an optical fiber of a second fiber optic cable is retained by the splice tray mounting portion, such that an end portion of the second buffer tube extends past the splice tray mounting portion and is retained by the splice tray, and the optical fiber of the second buffer tube extends from the second buffer tube and is wrapped around the second reel, such that the optical fibers are spliced together and held by the splice holder.

6. The fiber optic closure of claim 4, wherein a tie wrap is provided to secure the buffer tube to the splice tray mounting portion.

7. The fiber optic closure of claim 4, wherein a transition tube is provided around an end portion of the buffer tube and is held between the splice tray mounting portion and the splice tray.

8. The fiber optic closure of claim 1, further comprising a plurality of splice trays that are provided in a stacked arrangement along the splice tray mounting portion, wherein the plurality of splice trays are independently pivotable.

9. The fiber optic closure of claim 8, wherein the plurality of splice trays each include splice holders which retain spliced optical fiber portions.

10. The fiber optic closure of claim 1, wherein grommets are respectively provided in the first and second guides, the grommets having through holes for the passage of the fiber optic cable.

11. A fiber optic housing comprising:
    a first segment;
    a second segment;
    a hinge attached to the first and second segments such that the second segment is movable between an open and closed position, the hinge disposed at a bottom of the housing;

a first channel through which a fiber optic cable enters the housing; and a second channel through which the fiber optic cable exits the housing;

wherein the first and second channels extend from the first segment at a top portion of the housing.

12. The fiber optic housing of claim 11, wherein the hinge comprises an extension of the first segment and an extension of the second segment.

13. The fiber optic housing of claim 11, wherein the top portion of the housing comprises sloped end portions that intersect with corners of the housing.

14. The fiber optic housing of claim 13, wherein an area between the corners forms a top side of the housing and a length of the top side is greater than a length of any other side of the housing.

15. The fiber optic closure of claim 11, wherein the second segment has a planar bottom that faces a ground area when in the open position.

16. The fiber optic closure of claim 11, further comprising, a splice tray mounting plate within the housing; and at least one splice tray attached to the splice tray mounting plate, the splice tray having a splice holder which secures at least one fiber optic splice.

17. The fiber optic closure of claim 16, wherein a loop of slack buffer tubes of the fiber optic cable is wound around an inner circumferential area of the housing.

18. The fiber optic closure of claim 17, wherein a portion of the loop is tucked under the splice tray mounting plate.

19. The fiber optic closure of claim 16, further comprising at least one reel which protrudes from the splice tray, wherein at least one buffer tube including an optical fiber of the fiber optic cable is retained by the splice tray mounting plate, such that an end portion of the buffer tube extends past the splice tray mounting plate and is retained by the splice tray, and the optical fiber extends from the buffer tube and is wrapped around the reel.

20. The fiber optic closure of claim 19, wherein a second reel is provided which protrudes from the splice tray, and a second buffer tube of a second fiber optic cable including an optical fiber is retained by the splice tray mounting plate, such that an end portion of the second buffer tube extends past the splice tray mounting plate and is retained by the splice tray, and the optical fiber of the second buffer tube extends from the second buffer tube and is wrapped around the second reel, such that the optical fibers are spliced together and held by the splice holder.

21. The fiber optic closure of claim 19, wherein a transition tube is provided around an end portion of the buffer tube and is held between the splice tray mounting plate and the splice tray.

22. The fiber optic closure of claim 16, further comprising a plurality of splice trays that are provided in a stacked arrangement along the splice tray mounting plate, wherein the plurality of splice trays are independently pivotable.

23. The fiber optic closure of claim 22, wherein the plurality of splice trays each include splice holders which retain spliced optical fiber portions.

24. The fiber optic closure of claim 11, wherein grommets are respectively provided in the first and second channels, the grommets having through holes for the passage of the fiber optic cable.

25. A fiber optic housing comprising:

a first segment;

a second segment;

a hinge attached to the first and second segments so that the second segment is movable between an open and closed position;

a first channel through which a fiber optic cable enters the housing;

a second channel through which the fiber optic cable exits the housing;

a splice tray mounting board within the housing;

at least one splice tray attached to the splice tray mounting board, the splice tray having a splice holder which secures at least one fiber optic splice; and at least one reel which protrudes from the splice tray, wherein at least one buffer tube including an optical fiber of the fiber optic cable is retained by the splice tray mounting board, such that an end portion of the buffer tube extends past the splice tray mounting board and is retained by the splice tray, and the optical fiber extends from the buffer tube and is wrapped around the reel, and wherein a transition tube is provided around an end portion of the buffer tube and is held between the splice tray mounting board and the splice tray.

26. The fiber optic housing of claim 25, wherein a second reel is provided which protrudes from the splice tray, and a second buffer tube including an optical fiber of a second fiber optic cable is retained by the splice tray mounting board, such that an end portion of the second buffer tube extends past the splice tray mounting board and is retained by the splice tray, and the optical fiber of the second buffer tube extends from the second buffer tube and is wrapped around the second reel, such that the optical fibers are spliced together and held by the splice holder, and a second transition tube is provided around an end portion of the second buffer tube and is held between the splice tray mounting board and the splice tray.

27. The fiber optic housing of claim 25, wherein the second segment has a planar bottom that faces a ground area when in the open position.

28. The fiber optic housing of claim 25, wherein a loop of slack buffer tubes of the fiber optic cable is wound around an inner circumferential area of the housing.

29. The fiber optic housing of claim 28, wherein a portion of the loop is tucked under the splice tray mounting board.

30. The fiber optic housing of claim 25, further comprising a plurality of splice trays that are provided in a stacked arrangement along the splice tray mounting board, wherein the plurality of splice trays are independently pivotable.

31. The fiber optic housing of claim 30, wherein the plurality of splice trays each include splice holders which retain spliced optical fiber portions.

* * * * *